(12) United States Patent
Spasojevic

(10) Patent No.: US 7,177,477 B2
(45) Date of Patent: Feb. 13, 2007

(54) SELECTIVE GROUP MODELING

(75) Inventor: Zoran Spasojevic, Somerville, MA (US)

(73) Assignee: Aware, Inc., Bedford, MA (US)

( * ) Notice: Subject to any disclaimer, the term of this patent is extended or adjusted under 35 U.S.C. 154(b) by 869 days.

(21) Appl. No.: 10/382,773

(22) Filed: Mar. 7, 2003

(65) Prior Publication Data

US 2003/0169938 A1 Sep. 11, 2003

Related U.S. Application Data

(60) Provisional application No. 60/362,690, filed on Mar. 7, 2002.

(51) Int. Cl.
*G06K 9/36* (2006.01)
*G06K 9/46* (2006.01)

(52) U.S. Cl. .................................................. 382/240

(58) Field of Classification Search ................ 382/162, 382/164, 166, 224, 225, 232, 233, 240, 244, 382/246, 247, 250, 251; 341/50, 51, 59, 341/107; 375/240.03, 240.11, 240.19, 240.2, 375/240.24, 240.25; 348/398.1, 437
See application file for complete search history.

(56) References Cited

U.S. PATENT DOCUMENTS

| | | | | |
|---|---|---|---|---|
| 5,729,484 A | * | 3/1998 | Mack et al. ................ | 708/400 |
| 6,055,017 A | * | 4/2000 | Shen et al. ............. | 375/240.11 |
| 6,229,927 B1 | * | 5/2001 | Schwartz .................... | 382/248 |
| 6,538,583 B1 | * | 3/2003 | Hallmark et al. ............. | 341/51 |
| 6,553,147 B2 | * | 4/2003 | Chai et al. .................. | 382/240 |
| 6,728,316 B2 | * | 4/2004 | Enficiaud et al. ....... | 375/240.19 |
| 6,956,973 B1 | * | 10/2005 | Liang et al. ................ | 382/240 |
| 7,042,946 B2 | * | 5/2006 | Turaga et al. .......... | 375/240.19 |
| 2002/0027516 A1 | | 3/2002 | Yip | |
| 2003/0169938 A1 | * | 9/2003 | Spasojevic .................. | 382/240 |

OTHER PUBLICATIONS

Taubman, David S. et al. "JPEG2000 Image Compression Fundamentals, Standards And Practice"—whole book; ISBN 0-7923-7519-x.
International Search Report for PCT/US03/07008 dated Jul. 14, 2003.
Chen et al. "Analysis and Architecture design of EBCOT for JPEG2000" 2001; IEEE.
Schelkens et al. "Efficient Implementation of Embedded Zero-Tree Wavelet Encoding" 1999; IEEE.
Bao et al. "Low Complexity Binary Description Wavelet Codec" 1999; IEEE.
Taubman et al. "JPEG2000, Image Compression Fundamentals, Standards and Practice" Nov. 1, 2001.
International Search Report for PCT/US03/07009 dated Jul. 14, 2003.
Ordentlich et al. "Embedded Block Coding in JPEG2000" Sep. 10, 2001; vol. 2.

* cited by examiner

*Primary Examiner*—Amir Alavi
(74) *Attorney, Agent, or Firm*—Jason H. Vick; Miles & Stockbridge PC.

(57) ABSTRACT

Like type bits are grouped into continuous runs and thus are modeled and processed as a group. This allows entire groups of bits to be skipped by coding passes to which the coefficients do not belong. Furthermore, by using the context of a bit by looking at the significant state of its neighbors, and storing them in a specific order, bit-wise operations and memory accesses can be reduced.

11 Claims, 6 Drawing Sheets

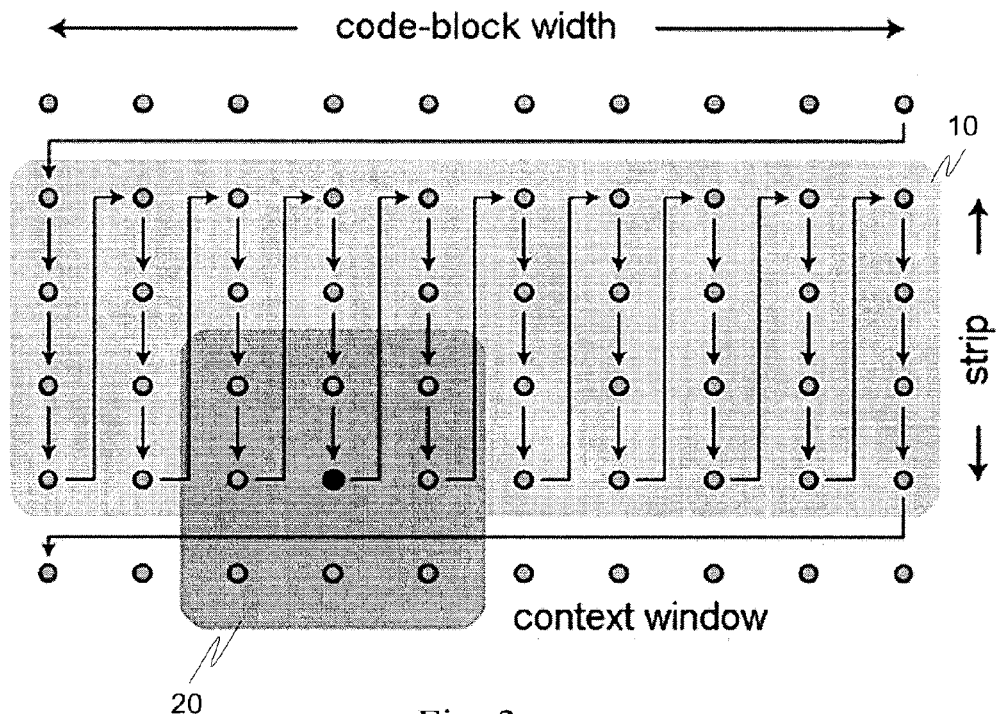
Fig. 3
Fig. 5
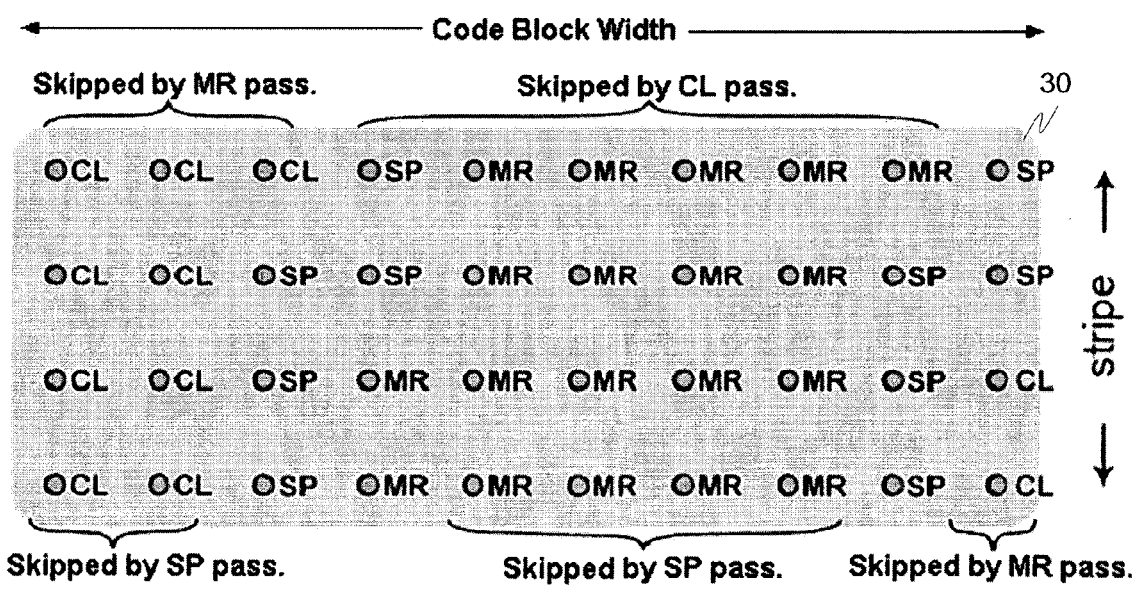

SELECTIVE GROUP MODELING

RELATED APPLICATION DATA

This application claims the benefit of and priority under 35 U.S.C. §119(e) to U.S. patent application Ser. No. 60/362,690, filed Mar. 7, 2002, entitled "Selective Group Modeling and Interlaced Signed Bit Coding," which is incorporated herein by reference in its entirety.

BACKGROUND OF THE INVENTION

1. Field of the Invention

This invention generally relates to the encoding and decoding of JPEG 2000 type images. In particular, this invention related to systems and methods for reducing the computational complexity and improving memory usage in image-processing devices.

2. Description of Related Art

With the dependence on multimedia technologies becoming greater exponentially, image compression techniques need to correspondingly increase in performance and provide new features. The JPEG 2000 standard is intended to provide rate-distortion and subjective image quality performance superior to existing standards and to also provide features and functionalities that current standards address only partially or do not address at all. The JPEG 2000 standard is designed to address requirements of a diversity of applications, for example, internet multimedia, color facsimile, printing, color printing, scanning, digital photography, remote sensing, mobile applications, medical imagery, digital library, and e-commerce, just to name a few.

Many of the intended image-processing devices have low computational power, such as digital cameras and hand-held devices. Thus, implementations of the JPEG 2000 standard that minimize the computational complexity and memory requirements of these devices are of great significance.

SUMMARY OF THE INVENTION

The systems and methods discussed herein present two techniques that are aimed at reducing the computational complexity of the coefficient bit modeler, which is the most complex part of the JPEG 2000 standard. The two techniques, selective group modeling and interlaced signed bit coding, at least improve the performance of the coefficient bit modeler over the base line implementation as described in the JPEG 2000 specifications by more than six times. Likewise, since the JPEG 2000 decoder is symmetric to the encoder, the two techniques have similar effect on the efficiency of decoding JPEG 2000 images.

A JPEG 2000 encoder/decoder comprises five major parts. Specifically, a color transformation module, a wavelet transformation module, a quantization module, a coefficient bit modeling module and an arithmetic encoding module. The coefficient bit modeler traverses a code block of quantized wavelet coefficients, i.e., a unit of data that the coefficient bit modeler processes, and directs the arithmetic encoder how to encode the bit.

The bit planes are traversed from the most significant bit plane to the least significant bit plan. Each bit plane is traversed with three different passes: the significance propagation pass (SP), the magnitude refinement pass (MR), and the clean-up pass (CL), in this order. The exception is the first, or most significant bit plane, which is traversed only with the clean-up pass. Each bit in a bit plan is covered with exactly one pass. That pass can start only when the previous pass has encoded all the relevant bits from the entire bit plane. If each bit plane is represented as a rectangular array of rows and columns, then the bits are group into horizontal strips four rows wide, starting from the top row, with the exception of the last strip, which could contain fewer than four rows. The bits are examined in a strip-wise manner starting from the top strip downward. Within a strip, the bits are examined column-wise from left to right starting with the top left bit.

Each quantized wavelet coefficient within a code block can have a significant or an insignificant state. All coefficients are initially insignificant. This state changes during a SP or a CL pass in the plane where the most significant one bit for that coefficient is encountered. Once a coefficient becomes significant, it remains significant for the remainder of the modeling process. From that point on, the significant coefficient bits are only handled by the MR pass. The states of the neighboring coefficients are used to determine the context of the bit under consideration. The context and the bit value are passed to the arithmetic encoding module for encoding the bit.

Accordingly, the systems and methods of this invention at least provide a method for grouping wavelet coefficients of the same type.

Aspects of the invention also relate to grouping wavelets of the same type into continuous runs.

Aspects of the invention further relate to grouping wavelet coefficients of the same type into continuous runs and modeling them as group during processing of individual bit-planes in a code block of wavelet coefficients.

Aspects of the invention further relate to grouping bits of the same type in a bit-plane into vertical four bit continuous runs.

Aspects of the invention additionally relate to storing information required to code bits and there signs in a column of a four-row strip during the significance propagation and clean-up passes in one memory location.

Aspects of the invention further relate to coding a bit based on its context.

Aspects of the invention further relate to storing information about bits and their signs.

Aspects of the invention additionally relate to storing information for coding 4 bits and their signs in a column of a 4-row strip in one memory location.

These and other features and advantages of this invention are described in, or apparent from, the following detailed description of the embodiments.

BRIEF DESCRIPTION OF THE DRAWINGS

The embodiments of the invention will be described in detailed, with reference to the following figures, wherein:

FIG. 3 illustrates the progression order in which the bits in a bit plane are coded;

FIG. 5 illustrates an exemplary strip in a bit plane according to this invention;

DETAILED DESCRIPTION OF THE INVENTION

The exemplary systems and the methods of this invention will be described in relation to image encoding and decoding. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in variety of ways beyond the specific details set forth herein. For example, the systems and methods of this invention can generally be applied to any type of coding, decoding and/or compression schemes, such as EBCOT, SPIHT, EZW, and the like.

Furthermore, while the exemplary embodiments illustrated herein show the various components of the coding/decoding system collocated, it is to be appreciated that the various components of the system can be located at distant portions of a distributed network, such as a LAN and/or the Internet, or within a dedicated coding/decoding system. Thus, it should be appreciated that the components of the coding/decoding system can be combined into one or more devices or collocated on a particular node of a distributed network, such as a communications network. It will be appreciated from the following description, and for reasons of computational efficiency, that the components of the group modeling and sign bit coding system can be arranged at any location within a distributed network without affecting the operation of the system.

Furthermore, it should be appreciated that the various links connecting the elements can be wired or wireless links, or a combination thereof or any other know or later developed element(s) that is capable of supplying and/or communicating data to and from the connected elements. Additionally, the term module as used herein can refer to any know or later developed hardware, software, or combination of hardware and software that is capable of performing the functionality associated with that element.

Figure 1:
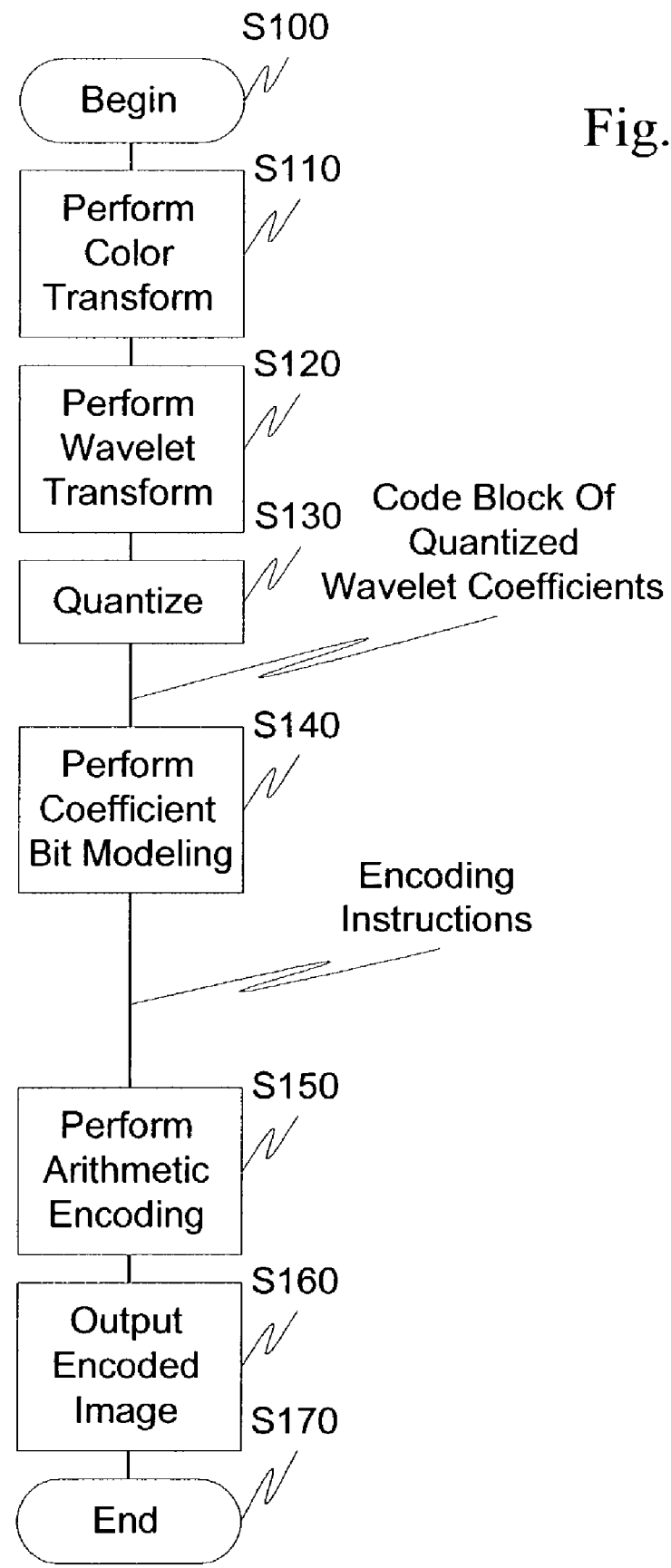
FIG. 1 illustrates an exemplary method of encoding an image.
Figure 4:
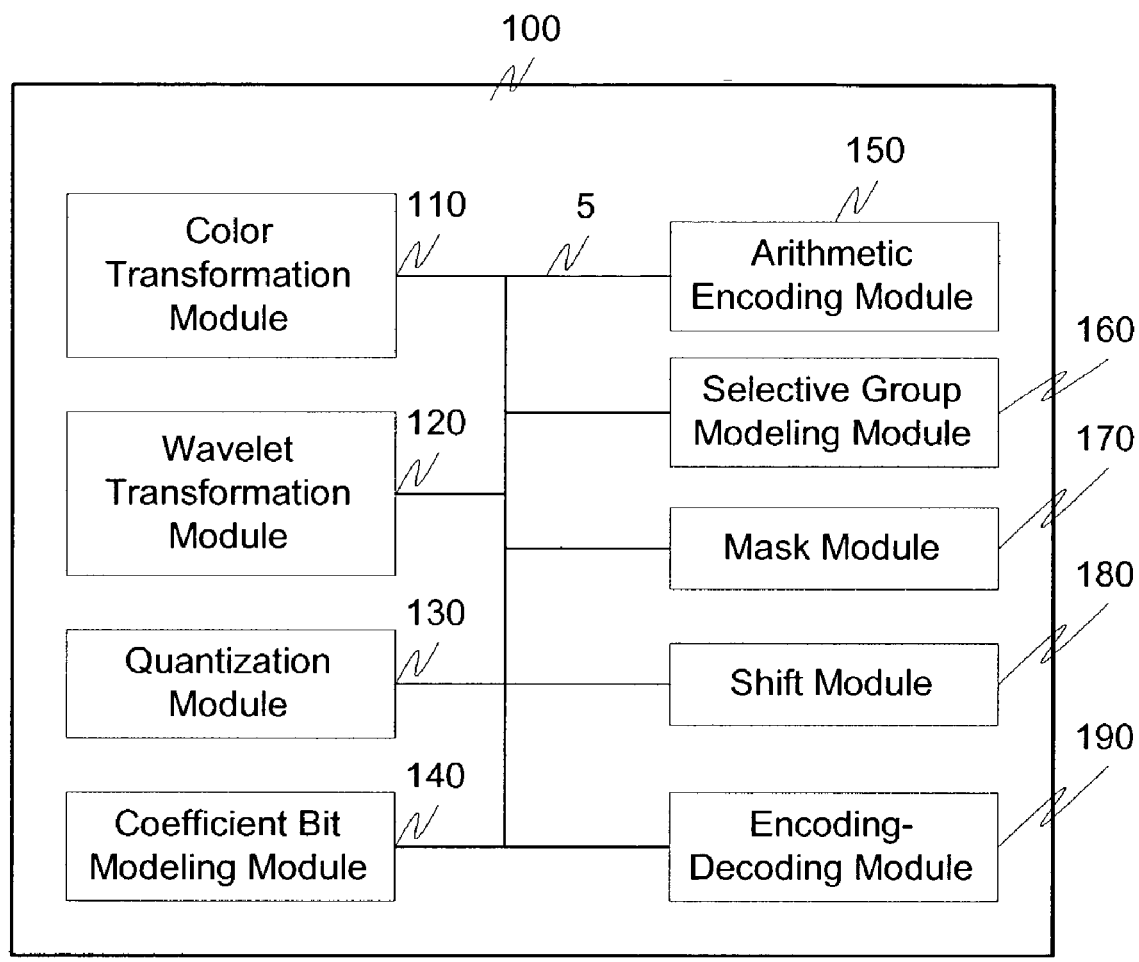
FIG. 4 is a functional block diagram illustrating the components associated with the group modeling and sign bit coding device according to this invention.

As previously discussed, and further with reference to FIGS. 1 and 4, the standard JPEG 2000 encoder comprises five major parts; the color transform module 110, the wavelet transform module 120, the quantization module 130, the coefficient bit modeling module 140 and the arithmetic encoding module 150. Specifically, the standard JPEG 2000 encoding begins in step S100 and continues to step S110. In step S110, the color transform is performed. Next, in step S120, the wavelet transform is performed. Then, in step S130, a quantization is performed which produces a code block of quantized wavelet coefficients. Controls then continue to step S140.

In step S140, coefficient bit modeling is performed which results in the traversal of a code block of quantized wavelet coefficients that produces instructions for how the arithmetic encoding is to be performed. Next, in step S150, the arithmetic encoding is performed. Then, in step S160, the encoded image is output and control continues in to step S170 were the control sequence images ends.

Figure 2:
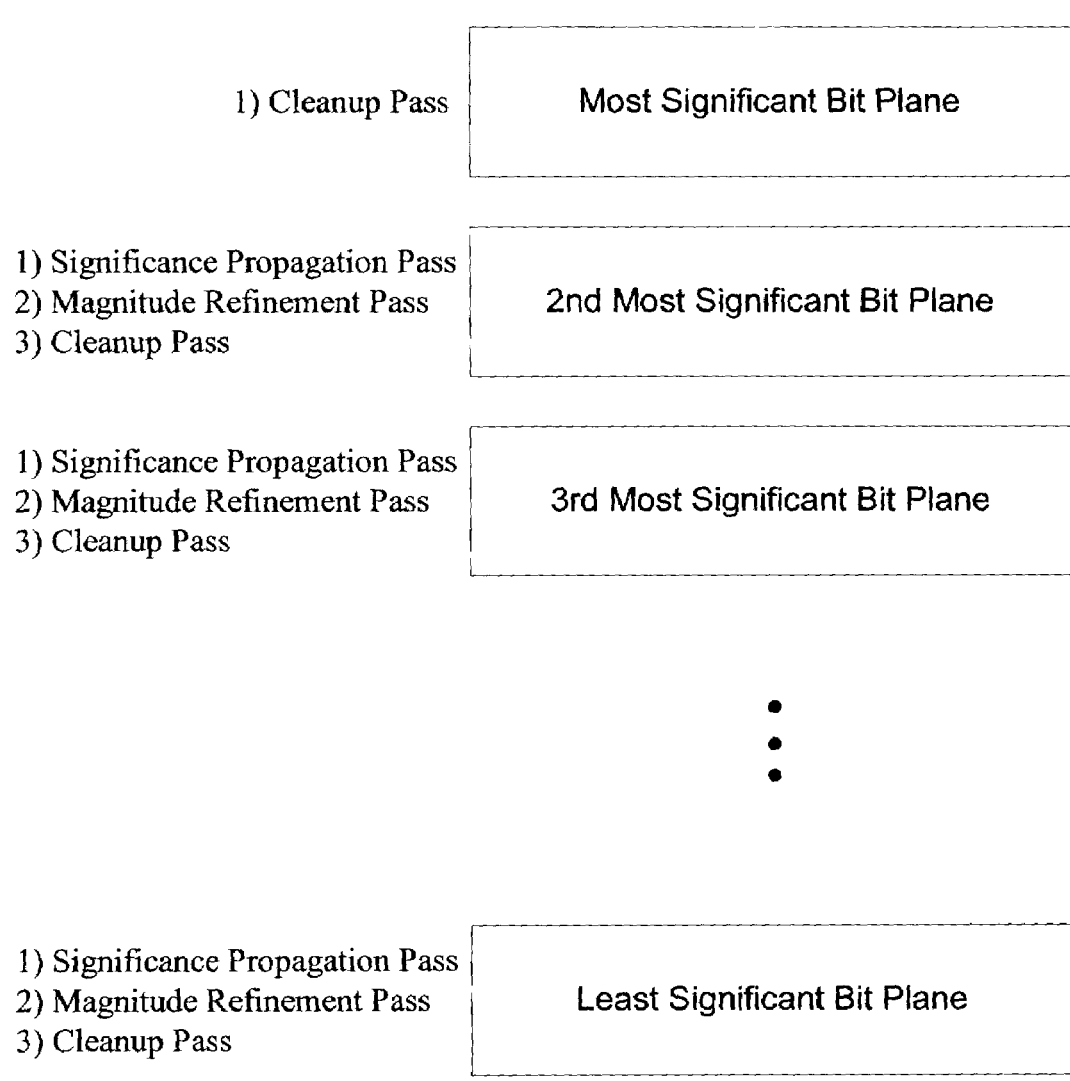
FIG. 2 illustrates an exemplary method of performing coefficient bit modeling.

FIG. 2 illustrates in greater detail the process performed during the coefficient bit modeling. In particular, the coefficient bit modeling module 140 traverses a code block of quantized wavelet coefficients. Specifically, the bit planes in the image are traversed from the most significant bit plane to the least significant bit plane. Each bit plane, beginning with the second most significant bit plane, is traversed with three different passes.

Specifically, first, the second most significant bit plane is traversed by the significance propagation pass. When the significance propagation pass finishes the second most significant bit plane, the magnitude refinement pass traverses the same bit plane. When the magnitude refinement pass finishes the second most significant bit plane, the cleanup pass starts on the most significant bit plane. When the cleanup pass finishes the second most significant bit plane, then the analyses of the third most significant bit plane begins with the significance propagation pass. When the third most significant bit plane is analyzed with all three passes in the same order as above, the analyzes of the next most significant bit plane begins. This procedure continues until the least significant bit plane is analyzed with all three passes.

However, it is to be noted that the first bit plane is only traversed with the clean-up pass as illustrated in FIG. 2. Accordingly, the process begins with the clean-up pass being performed on the most significant bit plane. Upon completion, control will continue to the second most significant bit plane where the significance propagation pass will be performed. The next pass will commence when the previous pass has encoded all the relevant bits from the entire bit plane. This process continues until all relevant bits from all bit planes have been traversed.

FIG. 3 illustrates an exemplary bit pane 10 that is represented as a rectangular array of rows and columns. The bits are grouped into horizontal strips four rows wide, starting from the top row, with the exception of the last strip, which could contain fewer than four rows. The bits are examined in a strip-wise manner starting from the top strip downward. Within a strip, the bits are examined column-wise from left to right starting with the top left bit.

Each quantized wavelet coefficient within a code block can have a significant or an insignificant state. All coefficients are initially insignificant. This state can change during a significance propagation pass or a clean-up pass in the plane where the most significant one bit for that coefficient is encountered. Once a coefficient is identified as being significant, the coefficient remains significant for the remainder of the modeling process. From this point on, the bits are only handled with the magnitude refinement pass.

Based on the context window 20, the states of the neighboring coefficients are used to determine the context of the bit under consideration. Determination of the contexts is based on the relative position of the neighboring significant bits to the bit being coded. Each permutation of the significant neighbors is assigned a context value. A total of 46 context values are used in the coding process. The context and the bit values are then passed to the arithmetic encoder for encoding of the bit.

FIG. 4 illustrates an exemplary encoding/decoding system 100. In particular, the system 100 comprises a color transformation module 110, a wavelet transformation module 120, a quantization module 130, a coefficient bit modeling module 140, an arithmetic encoding module 150, a selective group modeling module 160, a mask module 170, a shift module 180 and an encoding/decoding module 190, all interconnected by link 5. Furthermore, the system 100 can also include a controller and one or more memory or storage elements (not shown).

In operation, an image is received and the color transformation module 110 performs a color transformation producing a representation of the image in the YCrCb color coordinates. Next, the wavelet transformation module 120 performs wavelet transformation on the image data producing a representation of the image in the wavelet transform space. Then, the quantization module 130, quantizes the image data to produce a code block of quantized wavelet coefficients. This code block of quantized wavelet coefficients is forwarded to the coefficient bit modeling module 140, which performs the coefficient bit modeling according to the exemplary embodiment of this invention and forwards encoding instructions to the arithmetic encoding module 150.

More specifically, the coefficient bit modeling module 140 groups wavelet coefficients of the same type, i.e., those identified during the significance propagation pass, the magnitude refinement pass, or the clean-up pass, into continuous runs and models them as a group during processing of individual bit-planes in a code block of wavelet coefficients. Thus, since the coefficient bit modeling module 140 groups bits based on the pass in which they will be processed, entire groups of bit can be skipped by the coding passes to which these coefficients do not belong.

FIG. 5 illustrates an exemplary 4 row strip in a code block 30 in which bits of the same type in a bit-plane are grouped into vertical four bit continuous runs. In general, a run can have a length anywhere from one to the total number of columns in a code block. If all of the bits in a run do not belong to a particular pass, then that pass skips the entire run.

FIG. 5 illustrates an exemplary code block 30 where since the first two columns are grouped into the same type, they are skipped by the significance propagation pass. Likewise, the first three columns are skipped by the magnitude refinement pass since the bits have been grouped into runs of CL and SP bits. Likewise, columns 4–9 are skipped by the clean-up pass and rows 5–8 are skipped by the significance propagation pass. Finally, the last column can be skipped by the magnitude refinement pass.

Thus, during operation, the coefficient bit modeling module 140 performs a clean-up pass on the most significant bit plane. Next, for each of the remaining bit planes from the second significant bit plane through the least significant bit plane, wavelet coefficients of the same type are grouped onto continuous runs and modeled as a group during processing of the individual bit planes in a code block of wavelet coefficients. Specifically, a group of coefficients are examined to determine if they will be modeled, i.e., there is a run of the same type, in the significance propagation pass. If the coefficients are to be modeled, the coefficients in the group are encoded. Otherwise, the coefficient bit modeling module determines if it has reached the end of the bit plane.

If the end of the bit plane has been reached, the coefficient bit modeling module 140 moves to the beginning of the same bit plane and examines coefficients to determine if they can be grouped and modeled in the magnitude refinement pass. Otherwise, the coefficient bit modeling module 140 moves to the next group of coefficients.

If the coefficients are to be modeled, the coefficients in the group are encoded. Otherwise, the coefficient bit modeling module determines if it has reached the end of the bit plane.

If the end of the bit plane has been reached, the coefficient bit modeling module 140 moves to the beginning of the same bit plane and examines coefficients to determine if they can be grouped and modeled in the clean-up pass. Otherwise, the coefficient bit modeling module 140 moves to the next group of coefficients.

If the coefficients are to be modeled, the coefficients in the group are encoded. Otherwise, the coefficient bit modeling module determines if it has reached the end of the bit plane.

If the end of the bit plane has been reached, then the modeling and coding of all the coefficients in this bit plane is completed and the coefficient bit modeler moves to the beginning of the next most significant bit plane with the significance propagation pass. Otherwise, the coefficient bit modeling module 140 moves to the next group of coefficients. This process continues until all of the bit points have been analyzed and encoded with the arithmetic encoding module 150.

Figure 6:
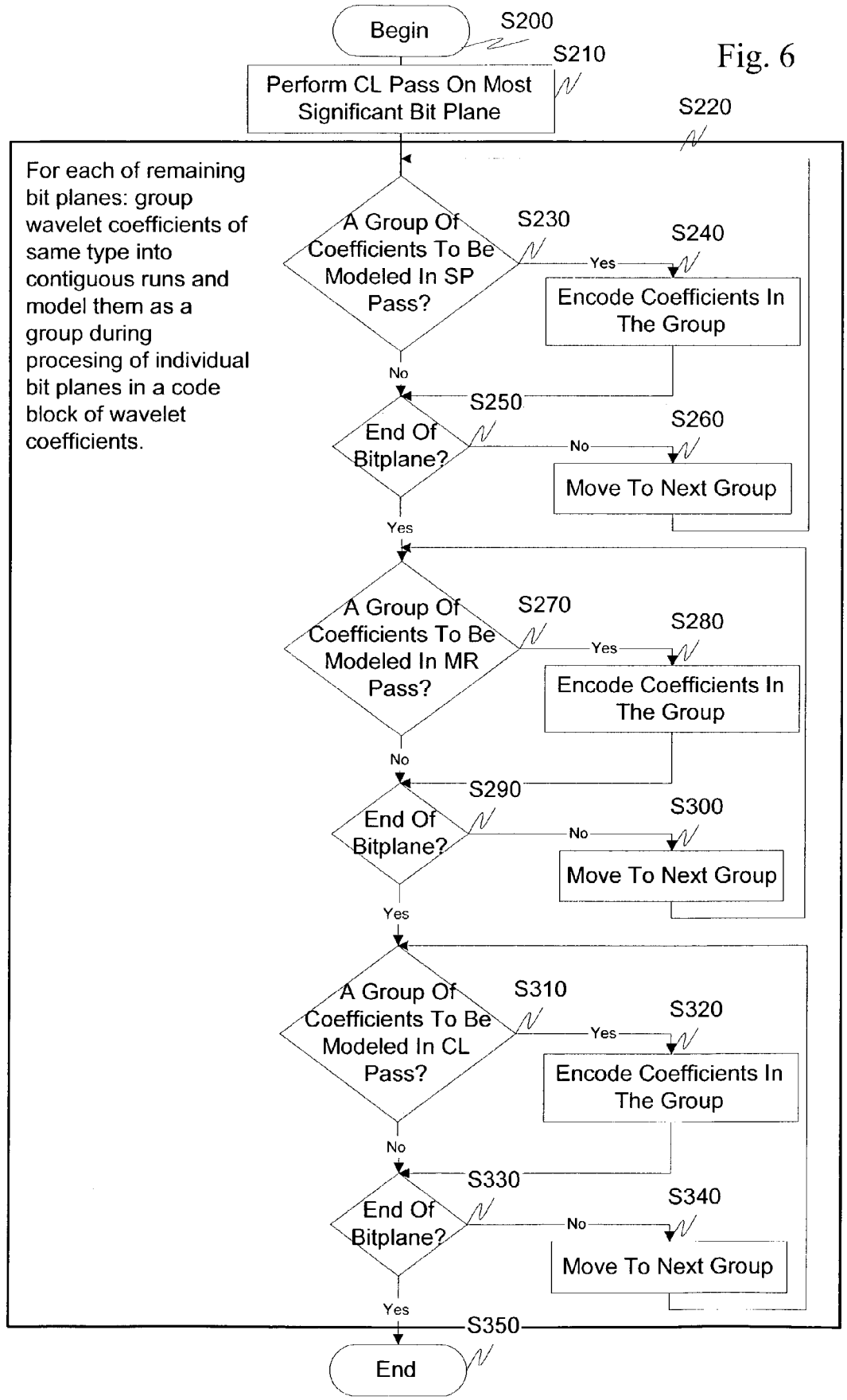
FIG. 6 illustrates an exemplary method for performing group modeling according to this invention.

FIG. 6 outlines an exemplary method for performing selective group modeling on one bit plane according to an exemplary embodiment of this invention. In particular, control begins an S200 and continues to step S210. In Step S210, a clean-up pass is performed on the most significant bit plane. Next, in step S220, for each of the remaining bit planes, wavelet coefficients of the same type are grouped into continuous runs and modeled as a group during processing of individual bit planes in a code block of wavelet coefficients.

Specifically, in step S230, a determination is made if a group of coefficients can be modeled in the significance propagation pass. If a group of coefficients can be modeled, control continues to step S240 were the coefficients in the group are encoded. Otherwise, control jumps to step S250. In step S250, a determination is made whether the end of the bit plane has been reached. If the end of the bit plane has not been reached, the system continues to the next group in step S260 and continues back to step S230. If the end of the bit plane has been reached, control jumps to step S270.

In step S270, a determination is made if a group of coefficients can be modeled in the magnitude refinement pass. If a group of coefficients can be modeled, control continues to step S280 were the coefficients in the group are encoded. Otherwise, control jumps to step S290. In step S290, a determination is made whether the end of the bit plane has been reached. If the end of the bit plane has not been reached, the system continues to the next group in step S300 and continues back to step S270. If the end of the bit plane has been reached, control jumps to step S310.

In step S310, a determination is made if a group of coefficients can be modeled in the clean-up pass. If a group of coefficients can be modeled, control continues to step S320 were the coefficients in the group are encoded. Otherwise, control jumps to step S330. In step S330, a determination is made whether the end of the bit plane has been reached. If the end of the bit plane has not been reached, the system continues to the next group in step S340 and continues back to step S310. If the end of the bit plane has been reached, control jumps to step S350 where the control sequence ends.

In conjunction with the selective group modeling discussed above, or as a stand alone system, the following methodology can be used to store the information required to code the four bits and their signs in a column of a four-row strip during the significance propagation and clean-up passes in once memory location. By using this methodology, for example, only one memory access would be required for coding such signs and their bits, thus significantly reducing the memory access time required by an encoding/decoding system. Furthermore, by storing this information in one memory location, the number of bit-wise operations in the sign context computation can be reduced.

To code a bit, the context of the bit is examined, i.e. the significance states of the bit's 8 neighbors (See FIG. 3). To code a sign bit, the sign context is examined, i.e., the significance states and the signs of two vertical and the two horizontal neighboring bits. The difficulty here is determining the right arrangement of the necessary information to fit in a 32-bit word. Since the 4 coefficients in a column of a strip four rows wide share certain neighbors, only 18 bits are needed to keep the states for all the neighbors for these coefficients. This idea was first discussed in JPEG 2000 Image Compression Fundamentals, Standards and Practice, David S. Taubman and Michael W. Marcellin (Kluwer Academic Publishers 2002), incorporated herein by reference in its entirety, under the name "State Broadcasting." The 18 bits under consideration are arranged in a specific order as described in the Table 1 below.

TABLE 1

| Bit Index | Neighbor | Neighbor Indexing | | | Coefficient Indexing |
|---|---|---|---|---|---|
| State Bits | | | | | |
| 0 | 0D0 | XD0 | XV0 | XD1 | COEF_0 |
| 1 | 0V0 | | | | COEF_1 |
| 2 | 0D1 | XH0 | COEF_X | XH1 | COEF_2 |
| 3 | 0H0 | | | | COEF_3 |
| 4 | COEF_0 | XD2 | XV1 | XD3 | |
| 5 | 0H1 | | | | |
| 6 | 1H0 | | X =0,1,2,3 | | |
| 7 | COEF_1 | | | | |
| 8 | 1H1 | | | | |
| 9 | 2H0 | | | | |
| 10 | COEF_2 | | | | |
| 11 | 2H1 | | | | |
| 12 | 3H0 | | | | |
| 13 | COEF_3 | | | | |
| 14 | 3H1 | | | | |
| 15 | 3D2 | | | | |
| 16 | 3V1 | | | | |
| 17 | 3D3 | | | | |
| Sign Bits | | | | | |
| 18 | 0V0 | | | | |
| 19 | 1V0 | | | | |
| 20 | 0H0 | | | | |
| 21 | 1H0 | | | | |
| 22 | 0H1 | | | | |
| 23 | 1H1 | | | | |
| 24 | 0V1 | | | | |
| 25 | 1V1 | | | | |
| 26 | 2H0 | | | | |
| 27 | 3H0 | | | | |
| 28 | 2H1 | | | | |
| 29 | 3H1 | | | | |
| 30 | 2V1 | | | | |
| 31 | 3V1 | | | | |

If the value of the bit under consideration is 1, then the sign context is determined for that bit. In addition to the states of the 18 bits, the signs of the 2 vertical and the 2 horizontal neighbors are used in the sign context computation. The number of neighbors needed to determine the sign context for 4 bits is 16. However, 2 of the neighbors are shared so there are only 14 distinct neighbors. If the sign bits of the neighbors are all saved in the same 32-bit word, with the 18 state bits of the neighbors, then there is no need for any additional memory accesses to retrieve any information in sign context computation.

However, if the sign bits of the neighbors are saved in the order shown in Table 1, the exemplary added benefit of minimizing the number of bit-wise operations in the sign context computation is realized. The result is that the number of bit-wise operations per one sign context computation can be reduced to 5 operations.

For example, to see how the sign context is determined, let s be a 32-bit word with bits labeled as in Table 1. To determine the index for the sign context in a lookup table of COEF_1, let st=s>>3 (>>is the down shift operator) and sn=s >>19. Then mask out in st all the bits except bits 1, 3, 5, 7 to obtain st1 (st1=st & 0x000000AA (& is the bit-wise 'and' operator)) and mask out in sn all the bits except bits 0, 2, 4, 6 to obtain sn1 (sn1=sn & 0x00000055). Then the desired index is st1 sn1 (|is the bit-wise 'or' operator). This new way of the sign context computation and the sign bit encoding will be referred to as interlaced sign bit coding.

In operation, the state bits and the sign bits are arranged within a 32-bit word. Next, and in cooperation with the mask module 170, all of the relevant bits are masked out except for the relevant four state bits. Then, in cooperation with the shift module 180, the result is shifted to position 0.

Next, again in cooperation with the mask module 170, all but the relevant four sign bits are masked out. Then, and in cooperation with shift module 180, the result is shifted to position 1. The controller (not shown) then bitwise OR's the two results and reads the sign context. The encoding/decoding module 190 then encodes the sign bit.

Figure 7:
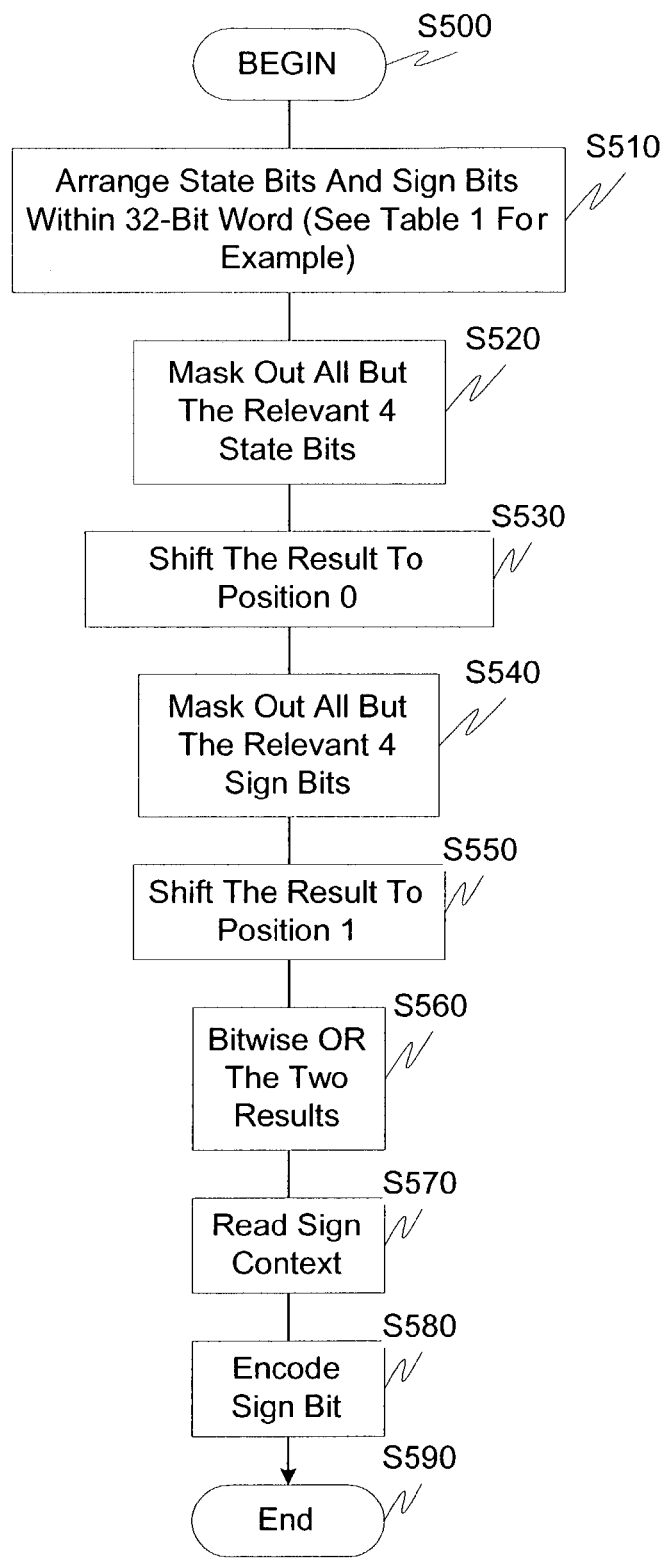
FIG. 7 illustrates an exemplary method for performing sign bit coding according to this invention.

FIG. 7 outlines an exemplary method of coding sign bits according to this invention. Specifically, control begins in step S500 and continues to step S510. In step S510, the state bits and the sign bits are arranged within a 32-bit word, for example as illustrated in Table 1. Next, in step S520, all of the relevant bits are masked out except for the relevant four state bits. Then, in step S530, the result is shifted to position 0. Control then continues to step S540.

In step S540, all but the relevant four sign bits are masked out. Next, in step S550 the result is shifted to position 1. Then, in step S560, the two results are bitwise OR'ed and the sign context read in step S570. Control then continues to step S580.

In step S580, the sign bit is encoded and control continues to step S590 where the control sequence ends.

The above-described systems and methods can be implemented on an image processing device, an encoding/decoding device, or the like, or on a separate programmed general purpose computer having image processing capabilities. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the flowcharts illustrated herein can be used to implement the image processing system according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems and methods illustrated herein however can be readily implemented in hardware and/or software using any known or later developed systems or structures, devices and/or software by those of ordinary skill in the applicable art from the functional description provided herein and with a general basic knowledge of the computer and data encoding/decoding arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of an image processor.

It is, therefore, apparent that there has been provided, in accordance with the present invention, systems and methods group modeling and sign bit coding. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method of modeling coefficients comprising:
analyzing a group of coefficients;
determining if the coefficients can be modeled as a group; and
modeling and encoding the coefficients as a group, thereby allowing the group to be skipped by one or more specific coding passes if the group does not belong to that specific coding pass.

2. The method of claim 1, further comprising performing a clean-up pass on the most significant bit plane.

3. The method of claim 1, wherein the modeling models coefficients in a significance propagation pass.

4. The method of claim 1, wherein the modeling models coefficients in a magnitude refinement pass.

5. The method of claim 1, wherein the modeling models coefficients in a clean-up pass.

6. The method of claim 1, wherein the method is performed in image encoding environments.

7. The method of claim 1, wherein the method is performed in image decoding environments.

8. The method of claim 1, wherein the coefficients are wavelet coefficients.

9. A system that models coefficients comprising:
a group modeling module that analyzes a group of coefficients and determines if the coefficients can be modeled as a group; and
a coding module that cooperates with the group modeling module to model and encode the coefficients as a group, thereby allowing the group to be skipped by one or more specific coding passes if the group does not belong to that specific coding pass.

10. A system for modeling coefficients comprising:
means for analyzing a group of coefficients;
means for determining if the coefficients can be modeled as a group; and
means for modeling and encoding the coefficients as a group, thereby allowing the group to be skipped by one or more specific coding passes if the group does not belong to that specific coding pass.

11. An information storage media comprising information that models coefficients comprising:
information that analyzes a group of coefficients;
information that determines if the coefficients can be modeled as a group; and
information that models and encodes the coefficients as a group, thereby allowing the group to be skipped by one or more specific coding passes if the group does not belong to that specific coding pass.

* * * * *